UNITED STATES PATENT OFFICE.

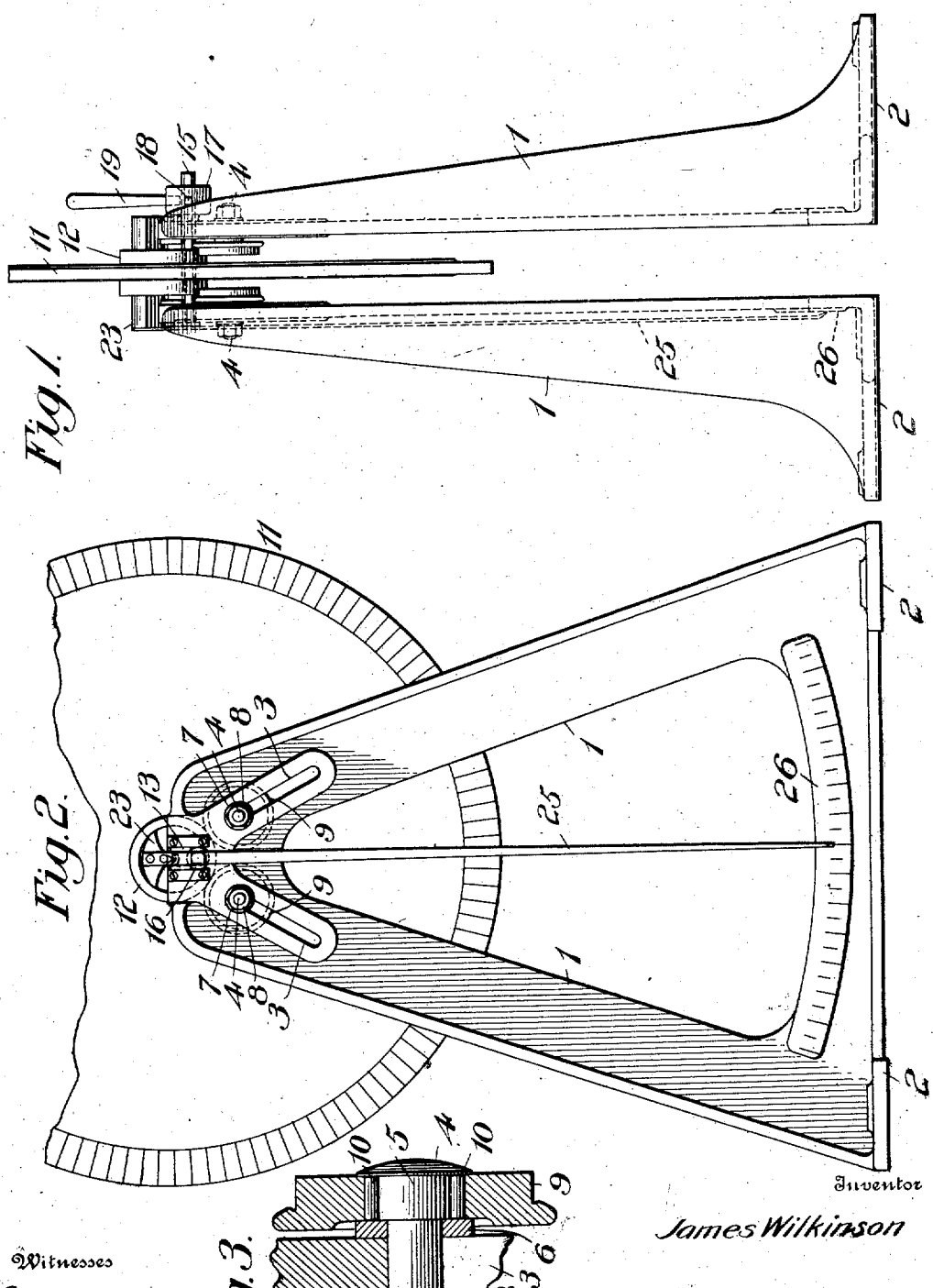

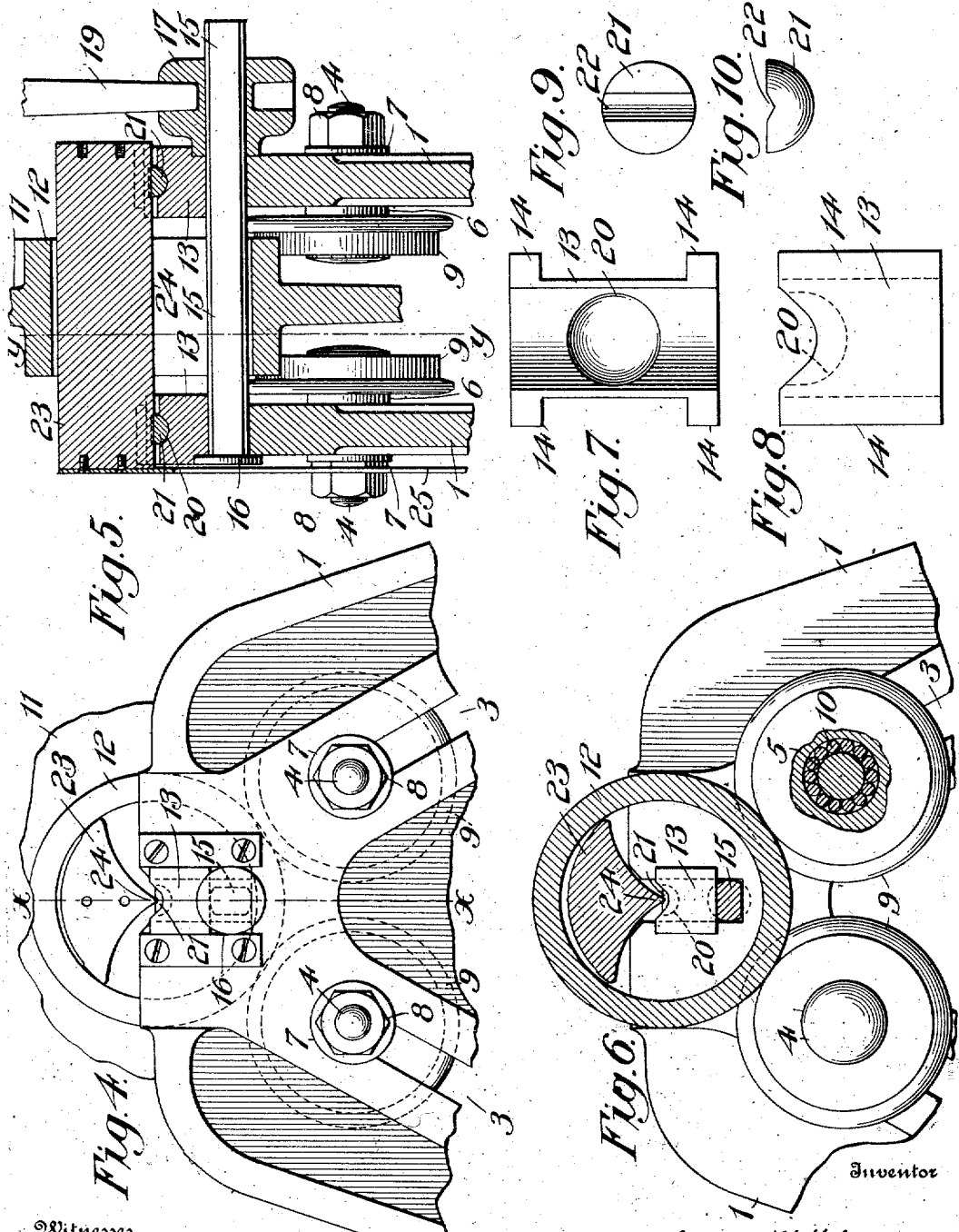

JAMES WILKINSON, OF PROVIDENCE, RHODE ISLAND, ASSIGNOR, BY MESNE ASSIGNMENTS, TO GENERAL ELECTRIC COMPANY, A CORPORATION OF NEW YORK.

BALANCING-MACHINE.

1,082,001.  Specification of Letters Patent.  Patented Dec. 23, 1913.

Application filed February 14, 1906. Serial No. 301,069.

*To all whom it may concern:*

Be it known that I, JAMES WILKINSON, a citizen of the United States, residing at Providence, in the county of Providence and State of Rhode Island, have invented new and useful Improvements in Balancing-Machines, of which the following is a specification.

My invention relates to a balancing machine for wheels, disks and similar devices, its object being to provide a mechanism which will enable an approximate balancing of the wheel to be quickly effected after which a more sensitive part of the mechanism is brought into play and facilitates the work of accurate or finer balancing.

My invention is particularly adapted for balancing bucket wheels for elastic fluid turbines and in its preferred form comprises antifriction wheels upon which the wheel hub is supported for the purpose of effecting an approximate balancing thereon and for the purpose of easily shifting the wheel to different positions for finer balancing. The friction of the antifriction roller bearing, however, is too great to permit of the accurate balancing necessary for high velocity wheels, for which reason it is desirable to complete the balancing by providing a bearing for the wheel having a minimum amount of friction against movements of the wheel to indicate its unbalanced condition. To this end I provide a pivotal knife edge bearing adapted to support the wheel preferably by moving said bearing into engagement therewith and then lifting the wheel clear of the roller bearing. I provide this knife edge bearing with an indicating mechanism which preferably comprises an elongated pointer arm, adapted to more than counterbalance the knife edge bearing block and to move in response to the slightest unbalanced condition of the wheel when supported on the knife edge bearing, which unbalanced condition acts to rock or tilt the bearing block and wheel on the knife edge pivot and accordingly to move the indicator.

In operation, the wheel hub is first supported on the roller bearings and the wheel ground or drilled for the purpose of obtaining an approximate balancing, after which it is pivotally supported on the knife edge bearing in positions 90 and 180 degrees apart and the accurate balancing thereof completed by reference to the indicating mechanism. The shifting of the wheel during the knife edge balancing is facilitated by lowering it on to the roller bearing, it being impractical to shift the wheel when resting on the knife edges.

The preferred embodiment of my invention is disclosed in the accompanying drawings, in which:—

Figure 1 represents an end view of the balancing machine with the wheel supported on the pivotal knife edge bearing. Fig. 2 is a side view, showing the position of the indicating mechanism when the wheel is practically balanced and supported on the bearing. Fig. 3 is an enlarged detail view of the supporting means for one of the roller bearings. Fig. 4 is an enlarged side view of the several parts constituting the balancing mechanism proper. Fig. 5 is a vertical section along the line $x$—$x$, Fig. 4. Fig. 6 is a view taken along the line $y$—$y$, Fig. 5, showing the wheel supported by the roller bearings. Figs. 7 and 8 are top and end views of the adjustable slides which support the knife edge bearing blocks. Figs. 9 and 10 are top and end views of the hardened bearing blocks for the knife edge bearing on which the wheel is supported.

The balancing machine as illustrated in the drawings comprises two vertical frames 1 having heavy bases 2 provided with bolt openings. These frames are triangular in side elevation and provided at their tops with angularly disposed slots 3, there being two slots in each frame. A screw bolt 4, having a cylindrical portion 5 next to its head and a reduced threaded end, passes through each of these slots, washers 6 and 7 being disposed on each side of the frame between the portion 5 and the nut 8, which latter engages and holds the bolt at any desired adjustment in the slot to suit different sized hubs. A flanged wheel 9 is journaled on each of the bolts 4, being mounted on antifriction rollers 10 which rest upon the surface 5. The wheels 9 are held between the heads of the bolts and the washers 6, their flanged portions being adjacent to their respective supporting frames. These four wheels when adjusted, form an antifriction roller bearing adapted to receive and support the hub of a wheel, disk or similar device, which is to be balanced.

In the drawings I have illustrated a turbine bucket wheel 11 provided with a hub 12, finished true on the outside, so that when the wheel is disposed between the frames and its hub seated on the wheels 9, it may be easily turned on its axis to different positions and brought to an approximate balance, its heavy side in each position, being drilled, cut, or ground for this purpose. The friction of the roller bearing will not permit of the wheel being so delicately balanced that very small differences in the distribution of the mass of a large wheel can be detected. When it is desired to secure an accurate balancing of a wheel, such as is required in turbine practice, it is necessary to support the wheel during the finer balancing operation in different positions upon a bearing which shall have a minimum amount of friction. This result is obtained by providing a pivotal bearing supported on knife edges. At the upper ends of the frames 1, are vertical slots open at the top and adapted to receive two vertically adjustable slide blocks 13 provided with side flanges 14 at each end which engage the sides of the slots and hold the slides against longitudinal movement therein. These slides rest upon a cam shaft 15 which bears on the bottom of the slots, said shaft being flattened on opposite sides and provided with a head 16 at one end. While the hub is resting on the roller bearings, this cam shaft 15 is inserted through the bore of said hub and the oppositely disposed vertical slots in the frames, its head 16 engaging one frame and a crank block 17 being slipped on the other end of the cam shaft and secured thereto by a set screw 18 at a point beyond the opposite frame. The cam shaft, which is thus free from displacement, serves to connect the frames together at their upper ends and, when turned by means of a crank or lever 19, to raise or lower the slides 13 simultaneously. I provide a socket 20 in the longitudinally grooved upper face of each slide and mount therein a hardened steel bearing block 21 in the form of a hemisphere and provided across its flat face with a transverse V-shaped channel 22. These blocks 21 are so disposed that their channels are in alinement. After the rough balancing of the wheel has been effected while supported on the roller carrying a knife edge bearing block 23 is passed through the hub 12. The member 23 is preferably of an inverted wedge or segmental shape in cross-section and is provided with a knife edge 24 adapted to rest in the channels 22 of the steel blocks 21. The knife edge block 23 or the slides 13 should be of such size, with relation to the shaft opening in the wheel, that when the cam shaft 15 is rocked to lift the slides 13, the upper side of said block will be brought into engagement with the bore of the wheel to lift the hub clear of the roller bearing and support it with its center of gravity a little below the knife edge bearing. When this occurs it will be seen that the wheel is pivotally supported on the knife edge bearing which has hardly any friction. To indicate the unbalanced condition of the wheel by the position of its supporting block, I provide an indicating mechanism comprising a needle or pointer 25 detachably connected to one end of the block 23 and movable over a scale 26 provided near the base of one of the frames. The indicating needle acts like a pendulum and shows on the scale in degrees the amount the wheel is out of balance. It also acts as a counterbalance for the block 23, being heavy enough to bring the center of gravity below the knife edge 24. In practice, the knife edge is usually in alinement with the wheel center or axis when the wheel is supported by the block 23, so that the center of gravity of the combined wheel and block is slightly below the center of gravity of the wheel which is therefore not in absolute equilibrium. When the cam shaft is moved to lower the block 23, the latter moves out of engagement with the wheel hub and enables the wheel to be turned freely on the roller bearings.

In operation, after the wheel has been approximately balanced on the roller bearing, it is balanced in one position on the knife edge after which the cam shaft is moved to lower the block 23 and transfer the wheel to the roller bearing on which it may be turned to a new position 90 or 180 degrees distant from that in which it was last balanced, when the cam shaft may be again moved to bring the block 23 into engagement with the wheel and transfer it back to the knife edge bearing to be balanced or for checking in this new position. Upon setting the needle so that it assumes a vertical position when free to swing with its block 23, and loading the latter with a wheel, if the needle, due to the unbalanced condition of the wheel, swings a certain number of degrees in one direction, then by lowering the wheel, turning it a half revolution and then supporting it on the knife edge again, the needle should swing an equal number of degrees to the other side of the center of gravity. The range of the needle is thus doubled and one reading checks the other. This process may be kept up during correction in various positions until the wheel is in satisfactory balance, when the block 23 and cam shaft may be removed and the wheel lifted off the roller bearing and out of the balancing machine.

The wheels 9 may be adjusted so that the center of the wheel or device to be balanced, when resting on them, will be slightly above the channels in the bearing blocks 21 of the slides 13 when the latter are lowered. It will also be evident that the frames 1 may be adjusted any desired distance apart, it being only necessary to provide a block 23 and a cam shaft of sufficient length to bridge them to enable the machine to balance devices of considerable width, such as large pulley wheels, drums, etc.

Without limitation to the details of construction or the arrangement of parts which represent one embodiment only of my invention, what I claim as new and desire to secure by Letters Patent, is:—

1. A balancing machine comprising a frame by which the device to be balanced is supported, wheels journaled to said frame, a pivotal bearing member supported by said frame, and means coöperating with said member to transfer said device, while supported by said frame, from said wheels to said pivotal bearing member and vice versa.

2. A balancing machine comprising a stationary frame, two bearings mounted on the frame and adapted alternatively to support a wheel or similar device, the distribution of whose mass is to be determined and balanced, said wheel or similar device being disposed substantially in a plane transverse to the axes of the bearings and one bearing being of lower frictional resistance than the other, and means coöperating with one of the bearings to transpose the device from said bearing to the other bearing and vice versa.

3. In a balancing machine, a supporting frame, a roller bearing and a knife edge bearing carried by said frame, and means to bring one or the other of said bearings into an independent supporting engagement with a device for the purpose of balancing it on one or the other of said bearings.

4. A balancing machine comprising a supporting frame for a device to be balanced, roller bearings on said frame adapted to receive and support said device during one part of the balancing-operation, pivotal bearings adapted to receive and support said device during the other part of the balancing operation, and means to adjust said bearings relatively for the purpose of transferring said device from one to the other, substantially as described.

5. A balancing machine for turbine wheels having cylindrical concentric portions, comprising two standards between which the wheel is adapted to be supported in a vertical position, wheels journaled to the frame and adapted to receive said cylindrical portions of the wheel, a detachable pivotal bearing block adapted to be passed through the wheel and rest on said frame, and means to adjust said block so as to support said wheel therefrom free of said wheels.

6. In a balancing machine, a vertical frame comprising relatively adjustable standards, bearing wheels on said standards, bearing blocks disposed above said wheels, and a detachable knife edge bearing block adapted to rest on said bearing blocks and support a device to be balanced between said standards and free of said wheels.

7. In a balancing machine for determining and adjusting the distribution of the mass of a wheel or similar device, the combination of a frame having vertical members with a space between them to receive the wheel or device, bearing blocks slidably mounted on said members, means carried by the frame for raising and lowering the blocks, and a pivotal bearing block that rests on each of said blocks and is adapted to be moved therewith to engage and support said wheel or device.

8. A balancing machine for turbine bucket wheels comprising a frame between parts of which the wheel is adapted to be supported in a vertical position, a wheel support having a knife edge and adapted to be passed through a central opening in the wheel and engage said frame so as to support said wheel therefrom on said knife edge, and a pointer connected to said knife edge support to indicate angular deflection thereof.

9. In a balancing machine, a vertical frame, bearing blocks provided with alining channels, adjustable slides carried by the frame which support said blocks, and a knife edge bearing block adapted to rest in said channels.

10. A balancing machine comprising a pair of relatively adjustable standards, a pair of wheels rotatably mounted on each standard and relatively adjustable thereon in inclined planes to and from each other, said wheels forming a roller bearing for a device to be balanced, a central support for said device adapted to rest on said rollers. and a knife edge bearing means supported by said standards, said wheels and bearing means being relatively adjustable, substantially as and for the purposes described.

11. In a balancing machine, a frame, a knife edge bearing thereon comprising bearing blocks and a pivotal inverted wedged-shaped bearing block resting on said blocks, means to raise and lower said bearing blocks and an indicating needle connected at one end to said pivotal bearing block and which depends therefrom to substantially counter-balance said block and bring its center of gravity below the knife edge bearing point.

12. A balancing machine for turbine bucket wheels comprising a frame, bearing blocks vertically adjustable in said frame, a grooved bearings inserted in said blocks, a knife edge balancing member adapted to be supported by said bearings and which is detachable so that it may be passed through the central opening in the wheel, means to raise said blocks to bring said member into supporting engagement with the wheel, and antifriction roller bearings to receive the wheel when said member and its bearing supports are lowered.

13. In a balancing machine, the combination of a stationary frame, means for supporting the body to be balanced from said frame so that it shall be capable of tilting with reference thereto comprising a bearing associated with said frame and a co-acting bearing associated with the body to be balanced, a third bearing associated with one of the bearings aforesaid also adapted to support the body to be balanced so that it shall be capable of tilting with reference to said frame, the first-mentioned bearing associated with said third bearing being shiftable with reference thereto, and means for shifting said shiftable bearing to transfer the support of the body from the other of the first-mentioned bearings to the third bearing, and vice-versa.

In testimony whereof I have hereunto set my hand in presence of two subscribing witnesses.

JAMES WILKINSON.

Witnesses:
H. M. UNRATH,
JAMES H. NOLAN.

---

It is hereby certified that in Letters Patent No. 1,082,001, granted December 23, 1913, upon the application of James Wilkinson, of Providence, Rhode Island, for an improvement in "Balancing-Machines," errors appear in the printed specification requiring correction as follows: Page 2, line 52, for the word "carrying" read *bearing;* and same page and line, for the word "bearing" read *carrying;* and that the said Letters Patent should be read with these corrections therein that the same may conform to the record of the case in the Patent Office.

Signed and sealed this 20th day of January, A. D., 1914.

[SEAL.]

J. T. NEWTON,
*Acting Commissioner of Patents.* antifriction roller bearings to receive the wheel when said member and its bearing supports are lowered.

13. In a balancing machine, the combination of a stationary frame, means for supporting the body to be balanced from said frame so that it shall be capable of tilting with reference thereto comprising a bearing associated with said frame and a co-acting bearing associated with the body to be balanced, a third bearing associated with one of the bearings aforesaid also adapted to support the body to be balanced so that it shall be capable of tilting with reference to said frame, the first-mentioned bearing associated with said third bearing being shiftable with reference thereto, and means for shifting said shiftable bearing to transfer the support of the body from the other of the first-mentioned bearings to the third bearing, and vice-versa.

In testimony whereof I have hereunto set my hand in presence of two subscribing witnesses.

JAMES WILKINSON.

Witnesses:
H. M. UNRATH,
JAMES H. NOLAN.

---

It is hereby certified that in Letters Patent No. 1,082,001, granted December 23, 1913, upon the application of James Wilkinson, of Providence, Rhode Island, for an improvement in "Balancing-Machines," errors appear in the printed specification requiring correction as follows: Page 2, line 52, for the word "carrying" read *bearing;* and same page and line, for the word "bearing" read *carrying;* and that the said Letters Patent should be read with these corrections therein that the same may conform to the record of the case in the Patent Office.

Signed and sealed this 20th day of January, A. D., 1914.

[SEAL.]

J. T. NEWTON,

*Acting Commissioner of Patents.*

Correction in Letters Patent No. 1,082,001.

It is hereby certified that in Letters Patent No. 1,082,001, granted December 23, 1913, upon the application of James Wilkinson, of Providence, Rhode Island, for an improvement in "Balancing-Machines," errors appear in the printed specification requiring correction as follows: Page 2, line 52, for the word "carrying" read *bearing;* and same page and line, for the word "bearing" read *carrying;* and that the said Letters Patent should be read with these corrections therein that the same may conform to the record of the case in the Patent Office.

Signed and sealed this 20th day of January, A. D., 1914.

[SEAL.]

J. T. NEWTON,

*Acting Commissioner of Patents.*